Aug. 2, 1960 — E. A. STALKER — 2,947,469
LIGHT WEIGHT AXIAL FLOW COMPRESSOR WHEELS
Filed April 23, 1954 — 2 Sheets-Sheet 1
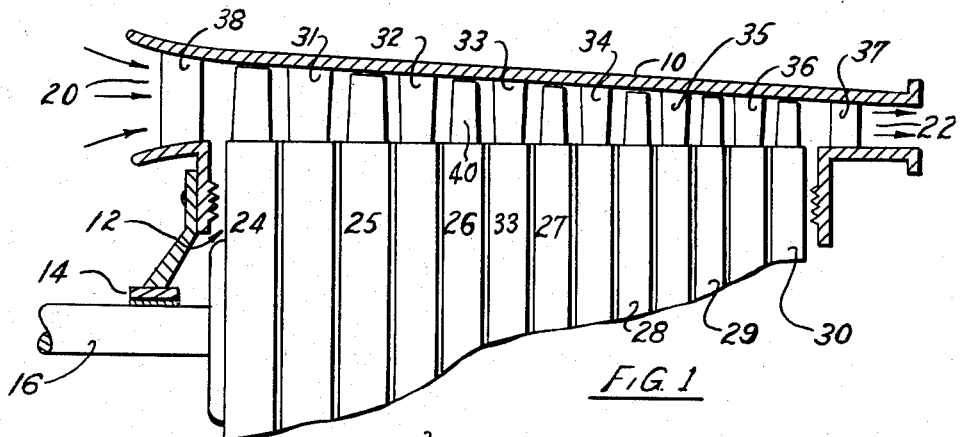
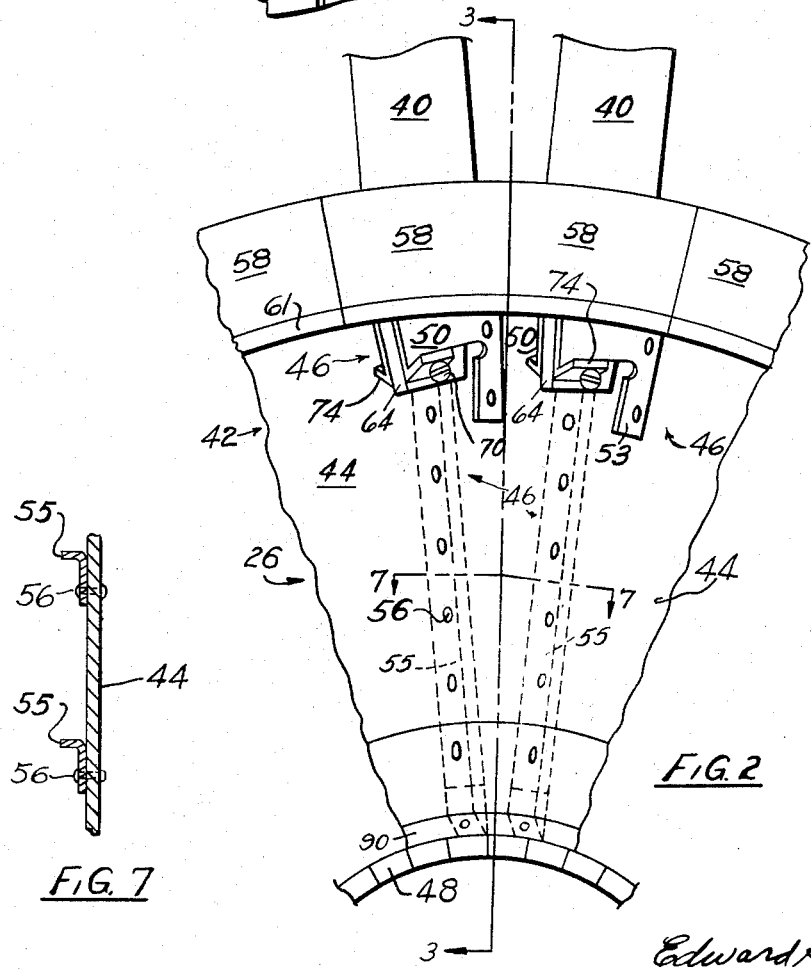
INVENTOR.
Edward A. Stalker Aug. 2, 1960 — E. A. STALKER — 2,947,469
LIGHT WEIGHT AXIAL FLOW COMPRESSOR WHEELS
Filed April 23, 1954 — 2 Sheets-Sheet 2

INVENTOR.
Edward A. Stalker

United States Patent Office 2,947,469
Patented Aug. 2, 1960

2,947,469

LIGHT WEIGHT AXIAL FLOW COMPRESSOR WHEELS

Edward A. Stalker, Bay City, Mich., assignor to The Stalker Corporation, a corporation of Michigan Filed Apr. 23, 1954, Ser. No. 425,205

11 Claims. (Cl. 230—134)

This invention relates to bladed axial flow wheels.

An object of this invention is to provide a wheel of light weight and relatively low cost for compressors, turbines and the like.

Another object is to provide a wheel in which the centrifugal loads of the blades are carried into the hub plate leaving the rim substantially free of these loads.

Still another object is to provide a wheel wherein the blade socket and a rim segment are a sub-assembly.

Other objects will appear from the description drawings and claims.

The above objects are accomplished by the means illustrated in the accompanying drawings in which—

Fig. 1 is a fragmentary axial section of an axial flow compressor;

Fig. 2 is an axial view of a fragment of a wheel;

Fig. 7 is an enlarged fragmentary section on line 7—7 in Fig. 2.

Figure 6:
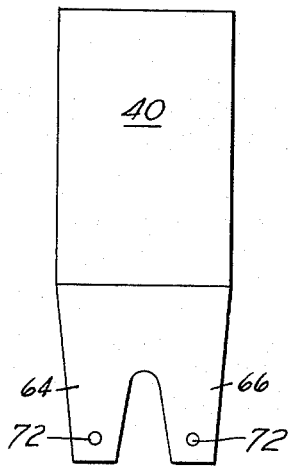
Fig. 6 is a side elevation of a blade.
Figure 4:
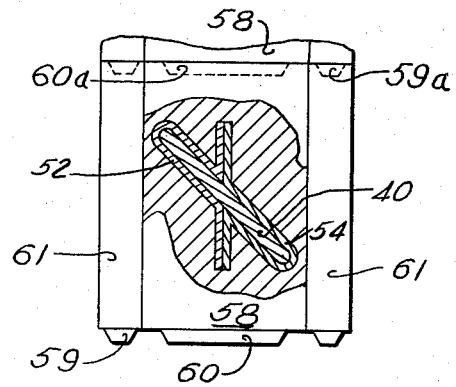
Fig. 4 is a fragmentary part section on line 4—4 in Fig. 3 of the rim of the wheel of Fig. 1.

Referring now to the drawings which show preferred embodiments of the invention, a compressor is shown in Figs. 1–7 wherein the case is indicated as 10 and the rotor as 12. The latter is mounted in suitable bearings such as 14 for rotation about the axis of shaft 16.

Rotation of the rotor inducts fluid into the annular inlet 20 and discharges it from the annular exit 22.

The rotor is comprised of the plurality of wheels 24—30. The stators are 31—37 and the inlet guide vanes are 38.

Figure 3:
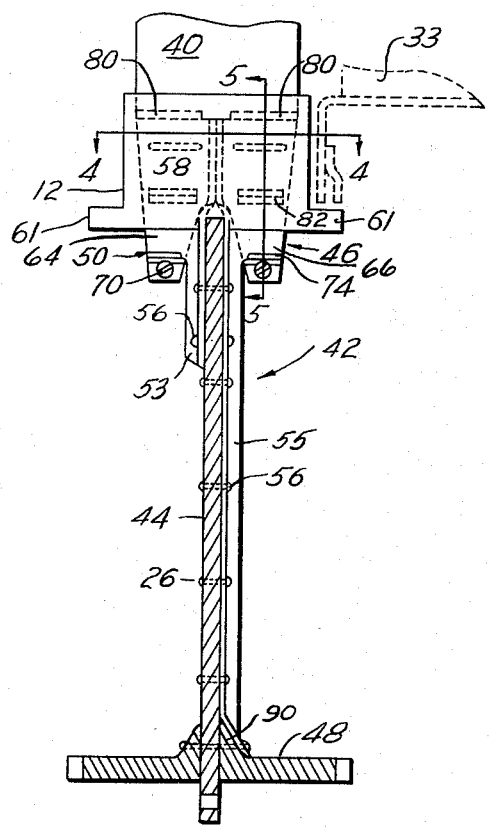
Fig. 3 is a fragmentary axial section of a wheel of the compressor of Fig. 1.
Figure 5:
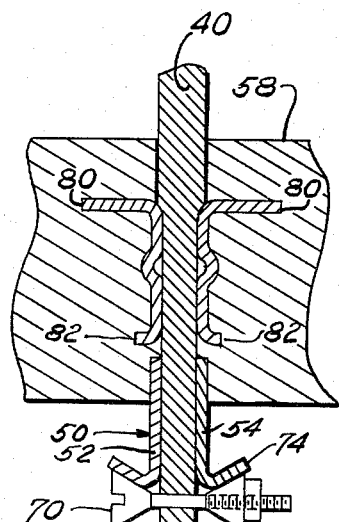
Fig. 5 is a fragmentary section on line 5—5 in Fig. 3.

The rotor wheels are similar so that it is sufficient to describe one of them, for example wheel 26. Referring particularly to Figs. 2 and 3, a plurality of rotor blades 40 are peripherally spaced about the hub structure 42 comprised of the hub plate 44, a plurality of socket means 46, and the hub clutch 48.

Each socket means comprises the blade socket 50 formed of two sheet metal pieces 52 and 54 on opposite sides of the blade root having the ribs 53 and 55 respectively riveted to opposite sides of hub plate 44 by rivets 56, and the rim means comprised of the rim segment 58 bonded to the socket 50. The rim segments are keyed by the tongues 59 and 60 fitting into similarly shaped recesses 59a and 60a respectively in the rim segment flanges 61 and the main body of the segment. See particularly Fig. 4.

The blade sockets 50 are preferably of formed sheet metal but may be made with thin walls by other means. The wall thickness can be of the same order as the thickness of the hub plate but is preferably much less.

Each blade 40 (Figs. 3 and 6) has its root end in a blade socket and the two legs 64 and 66 straddle the hub plate 44. Disengageable fastener means 70 pass through the holes 72 in the blade legs and bear on the flanges 74 of the socket, shown in Figs. 3 and 5.

In one form of the invention as shown particularly in Figs. 2–5 the rim segments 58 are made of plastic moulded and bonded to the blade sockets. That is each segment 58 and the socket and its ribs comprise a sub-assembly.

The plastic is preferably moulded to the socket in a die. To re-enforce the union of the plastic to the socket the latter has the projections 80 and 82 which may be punched out of the socket wall as shown.

The longer rib 55 of the socket structure, Figs. 2, 3, and 7 is fixed to the flange 90 of the clutch 48 by rivets. It may in addition be welded or soldered thereto. These ribs 55 which are fastened to and extend over a major portion of the radial extent of hub plate 44 serve to stiffen the plate against axial forces.

By carrying the centrifugal load of each blade directly into the hub plate the rim is kept free of these loads and it therefore can be light since it carries only its own centrifugal load. Accordingly it may be made of very light material such as a plastic in the forward stages of a compressor where the temperature is relatively low. In the rearward stages a light metal like magnesium, titanium or aluminum is indicated because of the relatively high temperature accompanying the compression.

The centrifugal force of each blade is carried radially inward directly to the hub plate so the rim is not required to carry any significant amount of this load. Accordingly the rim segments may be very light.

It will now be clear that the invention provides bladed wheel structures which are light and economical to produce. Since the rim segments are accurately die cast there is no difficulty of fitting one segment against the other or in securing a close fit against the blade surfaces. This saves labor and makes the wheel economical to produce.

While I have illustrated specific forms of the invention, it is to be understood that variations may be made therein and that I intend to claim my invention broadly as indicated by the appended claims.

I claim:

1. In combination in an axial flow wheel for interchanging force with a fluid, a wheel hub structure, a plurality of axial flow blades carried on said hub structure in peripherally spaced relation thereabout, said blades and said hub structure being adapted for rotation about an axis at high tip speeds to develop a substantial variation in pressure and density of said fluid flowing between said blades and developing centrifugal forces at the root ends thereof during said rotation, said hub structure comprising a sheet metal hub plate, thin metal walls defining a plurality of peripherally spaced sockets fixed to said plate, a rim means extending in the general axial direction between the leading and trailing edges of said blades and from blade to blade to sustain said variation in pressure, said rim means comprising formed segments of relatively light material fixed in said hub structure, each said blade having a root end portion secured in a said socket for transferring said centrifugal forces to said plate while keeping said rim means substantially free of said forces.

2. In combination in an axial flow wheel for interchanging force with a fluid, a wheel hub structure, a plurality of axial flow blades carried on said hub structure in peripherally spaced relation thereabout, said blades and said hub structure being adapted for rotation about said axis at high tip speeds to develop a substantial variation in pressure and density of said fluid flowing between said blades and developing centrifugal forces at the root ends thereof during said rotation, said hub structure comprising a sheet metal hub plate, thin metal walls defining a plurality of peripherally spaced sockets fixed to said plate, a rim means extending in the general axial direction between the leading and trailing edges of said blades and from blade to blade to sustain said variation in pressure, said rim means comprising formed segments of plastic bonded to said sockets, each said blade having a root end portion secured in a said socket for transferring said centrifugal forces to said plate while keeping said rim means substantially free of said forces.

3. In combination in an axial flow wheel for interchanging force with a fluid, a wheel hub structure, a plurality of axial flow blades carried on said hub structure in peripherally spaced relation thereabout, said blades and said hub structure being mounted for rotation at high tip speeds to develop a substantial variation in pressure and density of said fluid flowing between said blades and developing centrifugal forces at the root ends thereof during said rotation, said hub structure comprising a sheet metal hub plate, sheet metal walls defining a plurality of peripherally spaced socket structures having ribs extending inward in the general radial direction and being fixed to said plate, a rim means extending in the general axial direction between the leading and trailing edges of said blades and from blade to blade to sustain said variation in pressure, said rim means comprising a plurality of moulded segments bonded to said socket structures, each said blade having a root end portion secured in a said socket for transferring said centrifugal forces to said plate while keeping said rim means substantially free of said forces.

4. In combination in an axial flow wheel for interchanging force with a fluid, a wheel hub structure, a plurality of axial flow blades carried on said hub structure in peripherally spaced relation thereabout, said blades and said hub structure being adapted for rotation at high tip speeds to develope a substantial variation in pressure and density of said fluid flowing between said blades and developing centrifugal forces at the root ends thereof, said hub structure comprising a sheet metal hub plate, thin metal walls defining a plurality of peripherally spaced sockets fixed to said plate, said walls having a thickness less than the maximum thickness of said hub plate, a rim means extending in the general axial direction between the leading and trailing edges of said blades and from blade to blade to sustain said variation in pressure, said rim means comprising formed segments of relatively light material fixed in said hub structure, each said blade having a root end portion secured in a said socket for transferring said centrifugal forces to said plate while keeping said rim means substantially free of said forces.

5. In combination in an axial flow wheel for a machine for exchanging force with a fluid flowing therethrough, a central sheet metal plate, blade socket means secured to said plate, a plurality of axial flow blades secured to said socket means and extending radially outward therefrom, and rim means extending peripherally about said plate, said rim means extending between adjacent said blades adjacent the root ends thereof and from front to rear thereof to sustain a static pressure rise in said fluid, said rim means comprising a plurality of rim segments each fixed to said socket means.

6. In combination in an axial flow compressor, a compressor wheel for interchanging force with a fluid, a wheel hub plate of sheet metal, blade socket means secured to said plate, a plurality of axial flow blades fastened in said socket means in peripherally spaced relation about said plate, a plurality of rim segments fixed to said blades at the root ends thereof, said rim segments extending in the general axial direction between the leading and trailing edges of said blades and peripherally therebetween to sustain said variation in pressure, said blades and said rim segments being adapted for rotation at high tip speeds to develop a substantial variation in pressure and density of said fluid flowing between said blades and developing centrifugal forces at the root ends thereof, said blades and rim segments being secured to said socket means for transferring said centrifugal forces to said plate.

7. In combination in an axial flow compressor, a compressor wheel for interchanging force with a fluid, a wheel hub plate of sheet metal, blade socket means having ribs secured to said plate on opposite sides thereof, a plurality of axial flow blades fastened in said socket means, each said blade having legs extending into said socket means and straddling said plate in peripherally spaced relation about said plate, a plurality of rim segments fixed to said blades at the root ends thereof, said rim segments extending in the general axial direction between the leading and trailing edges of said blades and peripherally therebetween to sustain said variation in pressure, said blades and said rim segments being adapted for rotation at high tip speeds to develop a substantial variation in pressure and density of said fluid flowing between said blades and developing centrifugal forces at the root ends thereof, said blades and rim segments being secured to said socket means for transferring said centrifugal forces to said plate.

8. In combination in an axial flow compressor, a compressor wheel for compressing an elastic fluid, a wheel hub plate of sheet metal, a plurality of axial flow blades carried in said wheel in peripherally spaced relation about said plate, said blades and said hub plate being mounted for rotation at high tip speeds to develop a substantial increase in pressure and density of said fluid flowing between said blades and developing centrifugal forces at the root ends thereof and subjecting said wheel to axial forces, a plurality of separate rim segments each secured to a different said blade at the root end thereof and each extending peripherally, said rim segments also extending in the general axial direction between the leading and trailing edges of said blades to sustain said increase in pressure, disengageable fastener means for securing said blades on said wheel plate, and a plurality of peripherally spaced stiffener elements fixed on a side surface of said hub plate and projecting axially outward therefrom over a major portion of the radial extent of said plate.

9. In combination in an axial flow compressor, a compressor wheel for compressing an elastic fluid, a wheel hub plate of sheet metal, a plurality of axial flow blades carried in said wheel in peripherally spaced relation about said plate, said blades and said hub plate being mounted for rotation at high tip speeds to develop a substantial increase in pressure and density of said fluid flowing between said blades and developing centrifugal forces at the root ends thereof and subjecting said wheel to axial forces, a plurality of separate rim segments each secured to a different said blade at the root end thereof and each extending peripherally, said rim segments also extending in the general axial direction between the leading and trailing edges of said blades to sustain said increase in pressure, a bolt passing through each said blade at the root end thereof for securing said blades in said wheel, and a plurality of peripherally spaced stiffener elements fixed on a side surface of said disk and projecting axially outward therefrom over a major portion of the radial extent of said plate.

10. In combination in an axial flow bladed wheel for interchanging force with an elastic fluid, a wheel hub plate of sheet metal, a plurality of axial flow blades carried in said wheel in peripherally spaced relation about said plate, said blades and said hub plate being adapted for rotation at high tip speeds to develop substantial change in pressure and density of said fluid flowing between said blades and developing centrifugal forces at the root ends thereof subjecting said wheel to axial forces, each said blade being secured to said plate at a selected radial and peripheral position to sustain said centrifugal forces, a plurality of rim segments, each secured to a single said blade at a locality which is radially outward of said position, said rim segments extending between blades and in the general axial direction between the leading and trailing edges of said blades to sustain said change in pressure, and a plurality of peripherally distributed stiffener elements fixed to a side of said plate and projecting axially outward therefrom over a major portion of the radial extent of said plate to sustain said axial forces.

11. In combination in an axial flow bladed wheel for interchanging force with an elastic fluid, a wheel hub plate, a plurality of axial flow blades carried in said wheel in peripherally spaced relation about said plate, said blades and said hub plate being adapted for rotation at high tip speeds to develop substantial change in pressure and density of said fluid flowing between said blades and developing centrifugal forces at the root ends thereof subjecting said wheel to axial forces, each said blade being secured in said wheel by fastener means including a bolt passing through each said blade at the root end thereof to sustain said centrifugal forces, a plurality of rim segments each secured to a single said blade at a locality which is radially outward of said fastener means, said rim segments extending between blades and in the general axial direction between the leading and trailing edges of said blades to sustain said change in pressure, and a plurality of peripherally distributed stiffener elements fixed to a side of said plate and projecting axially outward therefrom over a major portion of the radial extent of said plate to sustain said axial forces.

References Cited in the file of this patent

UNITED STATES PATENTS 926,442    Smoot  ---------------- June 29, 1909

FOREIGN PATENTS 318,899    Great Britain  ---------- Apr. 17, 1930